Nov. 18, 1969     V. G. BONESSA     3,478,603
WHEEL BALANCE METHOD
Filed Nov. 16, 1966
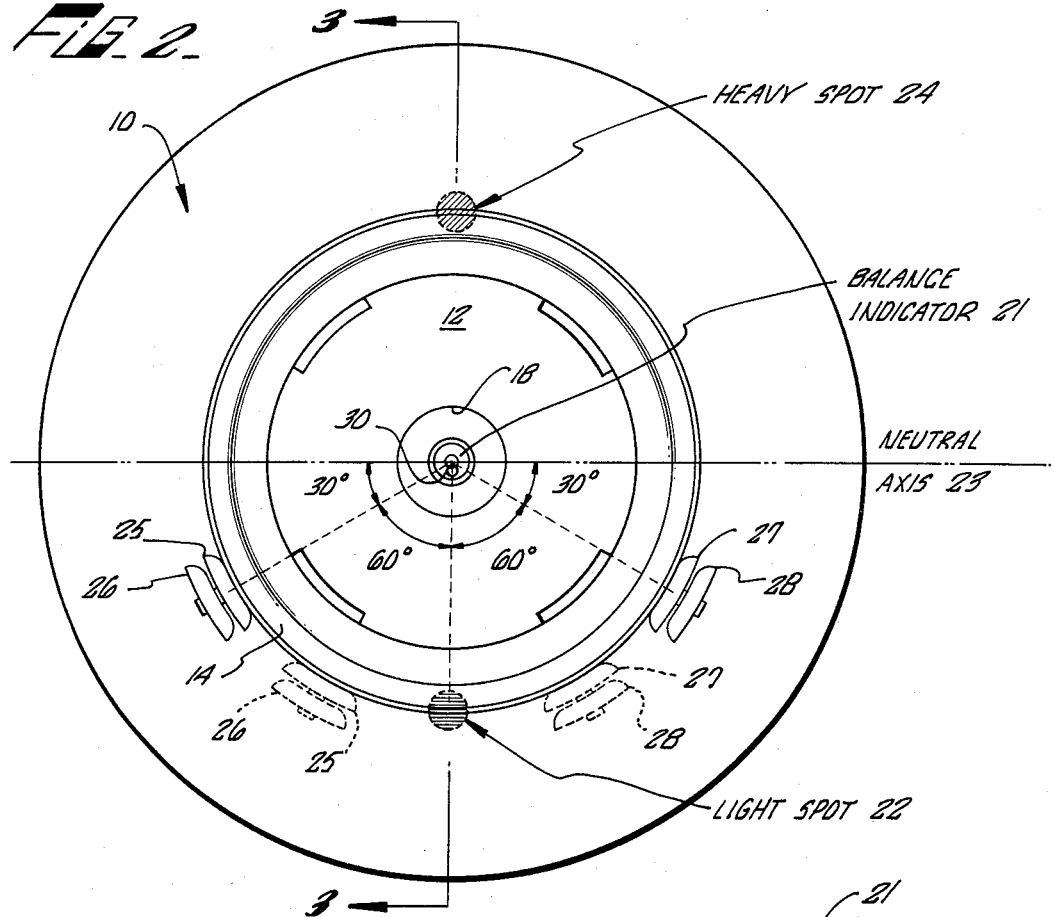
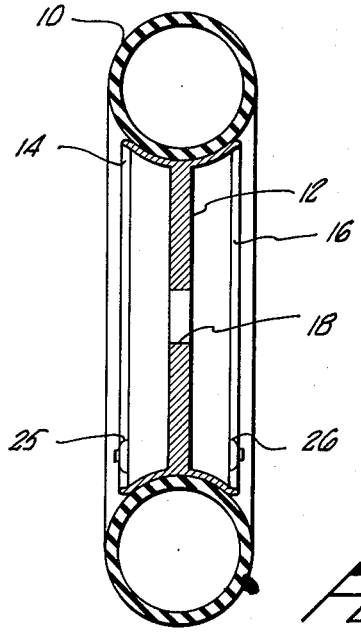
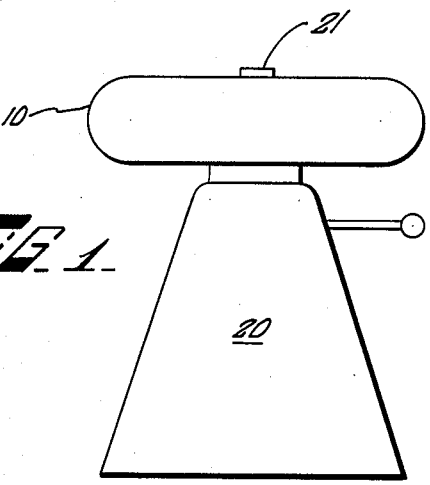
INVENTOR.
VICK G. BONESSA
BY
Christie, Parker & Hale
ATTORNEYS.

:::::::::::::: {.center}
United States Patent Office

3,478,603
Patented Nov. 18, 1969
::::::::::::::

3,478,603
WHEEL BALANCE METHOD
Vick G. Bonessa, Arcadia, Calif., assignor to The Bada Company, Pasadena, Calif., a corporation of California
Filed Nov. 16, 1966, Ser. No. 594,941
Int. Cl. G01m 1/30
U.S. Cl. 73—483                                   1 Claim

ABSTRACT OF THE DISCLOSURE

A method of balancing automotive wheels in which a wheel to be balanced is placed horizontally upon a balancing machine, such as a "bubble balancer," capable of indicating with accuracy the light spot of the wheel at which added balance weights are most effective to balance the wheel. Provide at least two and optimally three sets of four balance weights, the weight in each set being of equal mass and increasing in mass in selected increments from set to set. One set of weights is placed on the rim of the wheel in pairs 120 degrees apart from each other around the rim and 60 degrees from opposite sides of the wheel light spot. The pairs are moved symmetrically toward or away from the light spot along the wheel rim, depending upon whether or not the initial placement of the weights overbalances the wheel, until a condition of wheel balance is achieved. Then one weight of each pair is connected to the wheel rim on the one side of the wheel at that location corresponding to the adjusted position of the pair at the time of balance, and the other weight is connected to the other side of the wheel at a corresponding position.

---

This invention relates to a method for balancing vehicle wheels, and has particular reference to a four-weight method for statically balancing wheels on a pivot point wheel balancing machine without upsetting the dynamic balance of the wheel.

Pivot point balancing machines are well known and are commonly found in tire stores and automobile service centers where wheel balancing services are offered to the public. The general concept is that when an automobile wheel, having a tire mounted to it, is placed at rest horizontally on the pivot point machine, any static unbalance of the wheel will cause it to deviate from the horizontal, as indicated by a bubble (spirit) level on the machine. Conventionally, the wheel is statically balanced by the application of one or more small lead weights, called wheel weights or rim weights, to the rim of the wheel in a manner which causes the wheel to return to a horizontal plane and the bubble to center within the level. The place on the wheel at which the weight or weights should be applied is indicated in a general way by observing the highest point on the wheel rim when it is tilted from the horizontal by its unbalanced condition, this highest point being referred to as the "light spot" or "point of maximum effectiveness" of applied wheel weights. The light spot can also be located more accurately by observing the direction in which the bubble of the level is displaced from the center of the level. Each rim weight essentially is a piece of alloyed lead having a small steel clamp formed integrally with the weight. The clamp snaps over the rim of the wheel when hit by a hammer.

This invention provides a method of balancing an automobile wheel on the type of machine described above with great accuracy yet without disturbing the dynamic balance of the wheel; in the vast majority of cases, the practice of this invention reduces the effect of dynamic unbalance of the wheel. Adherence to the method described herein eliminates entirely the inaccurate, inadequate and detrimental results of balancing procedures relying upon a single weight to achieve wheel balance; single-weight procedures require the maintenance of a large inventory of a large number of different weights which vary progressively in size. Single-weight procedures inherently are ineffective to correct all unbalance conditions encompassed by the multiple weight inventory, and such practices obviously change the dynamic balance of the wheel. The present method has no "gaps" relative to unbalance conditions below unbalance conditions which are so severe as to require corrective procedures going beyond the scope of techniques relying solely upon the addition of weight to the wheel. Also, the use of the present method reduces to a minimum the number of different weights which must be stocked to enable the balancing of the vast majority of unbalanced wheels. The method is characterized by its simplicity and reliability.

United States Patent 3,002,388, owned by the assignee of the present invention, describes another four-weight method which is also effective to balance wheels efficiently. The practice of this invention, however, can result in a quicker balance than results from the practice of the method described and claimed in this patent. Also, this invention absolutely eliminates any possible chance that a wheel susceptible of being balanced statically by the addition of weights will not be properly balanced.

Briefly, the present method includes the steps of positioning a wheel to be balanced, including a tire mounted to the wheel, horizontally upon a wheel balancing machine and measuring, with a high degree of accuracy, any deviation of the plane of the wheel from the horizontal, thereby to locate the point on the wheel adjacent the rim of maximum balancing effectiveness of balancing weights applied to the wheel. The method also comprehends placing a set of four balancing wheel weights of selected and equal mass adjacent the rim of the wheel and arranging the weights in two pairs of weights disposed substantially 120 degrees from each other around the rim and substantially 60 degrees from opposite sides of the point of maximum effectiveness. The weights are then adjusted, in pairs, symmetrically along the wheel rim toward the point of maximum effectiveness if the weights as initially positioned are ineffective to balance or overbalance the wheel, and away from the point of maximum effectiveness if the weights as initially positioned are effective to overbalance the wheel. When a condition of balance is obtained, i.e., when the wheel returns to a horizontal position, one weight of each pair is connected to the wheel rim at the adjusted position of the pair. The other weight of each pair is then secured to the wheel rim at the other side of the wheel at a position approximately corresponding to the circumferential position on the wheel of its mate.

The above-mentioned and other features of the invention are more fully set forth in the following description of the invention, which description is presented with reference to the accompanying drawings, wherein:

FIG. 1 is a schematic elevation view of an automobile wheel resting on a conventional pivot point balancing machine;

FIG. 2 is a top plan view of the wheel on the machine; and

FIG. 3 is a schematic elevation view taken along line 3—3 of FIG. 2 showing the placement of rim weights on opposite sides of the wheel.

FIGS. 1 to 3 illustrate an automobile wheel having a tire 10 mounted on a wheel 12. The wheel has an outboard rim portion 14, an inboard rim portion 16, and a central aperture 18. The wheel rests on a conventional wheel balancing machine 20.

An upper portion of the balancing machine, which includes a balance indicator 21 usually in the form of a circular bubble level, extends through the central aperture of the wheel.

When the wheel is placed on the machine so that the plane of the wheel is in a horizontal position, any static unbalance of the wheel will cause the plane of the wheel to deviate from the horizontal. By observing the bubble level and the tilting of the wheel, the highest point of the wheel can be readily ascertained. This point is usually referred to as the "light spot" and is the theoretical position on the rim of the wheel where the application of a single weight of suitable size will bring the wheel into a perfect static balance such that the wheel returns to a horizontal position and the bubble 30 of the level indicator returns to the center of the level. The light spot is indicated in FIG. 2 by dotted circle 22. The wheel, theoretically, is divided into a heavy side and a light side by a neutral axis 23; the application of equal weights to the wheel at diametrically opposed locations along the neutral axis has no effect upon the static unbalance of the wheel. The wheel can be considered to possess a heavy spot 24 diametrically opposite from the light spot.

To balance wheel/tire combination 10, 12 according to this invention, a set of four rim weights 25, 26, 27, 28 are placed upon the upper surface of the wheel on the tire just adjacent wheel rim portion 14. Weights 25–28 comprise one of at least two, and preferably three different sets of available weights and preferably is the set of intermediate weight. Weights 25–28 are of equal size and weight. The weights are placed adjacent the wheel rim in pairs 25, 26 and 27, 28 disposed substantially 120 degrees apart from each other on opposite sides of and substantially 60 degrees from opposite sides of light spot 22 around the rim of the wheel. The intermediate set of weights preferably is used initially for the reasons set forth below.

The balancing process is carried out, after weights 25–28 are initially placed as described above, by moving the weights in pairs either toward or away from the light spot until balance of the wheel, as shown by indicator 21, is achieved. If the initial placement of the weights results in the wheel being overbalanced such that the bubble in the indicator moves toward the heavy spot, the weights are positionally adjusted in pairs 25, 26 and 27, 28 symmetrically away from the light spot toward, even to, the neutral axis. On the other hand, if the initial placement of the weights results in no change of the attitude of the wheel and the bubble does not move to the other side of the level indicator, it is known that the wheel is still unbalanced and the weights then are moved in pairs symmetrically toward the light spot. When the required adjustment of the weights has been achieved, as shown in dotted lines in FIG. 2, weights 25 and 27 are connected to rim portion 14 adjacent, i.e., radially of the adjusted positions of the weights at equal distances from the light spot. Weights 26 and 28 are secured to rim portion 16 at locations opposite from weights 25 and 27, respectively, i.e., at the same distances from the light spot as weights 25 and 27, respectively.

To obtain the best balance possible, however, it is desired that once the adjusted positions of weight pairs 25, 26 and 27, 28 have been determined, these positions be marked on the tire tread portion with chalk, for example. The wheel is then removed from the balancing machine and weights 26 and 28 are secured to inboard rim portion 16 radially inwardly of the chalk marks. The wheel is then returned to the balancing machine with its outboard rim disposed upward. Weights 25 and 27 are placed loosely on the wheel radially inwardly of the chalk marks at their previously determined adjusted positions. If weights 26 and 28 have been secured to the wheel at the proper positions relative to the light spot, the wheel should be perfectly statically balanced. If, however, weights 26, 28 have not been placed at just the positions desired, the level indicator will show a slight static imbalance in the wheel. It is a simple matter to finely adjust the positions of weights 25, 27 to obtain an essentially perfect balance of the wheel.

The method of this invention can be practiced successfully beginning with the lightest set of four weights, and working upwardly through the intermediate and heavy weight sets, as required. If the first and lightest set of weights applied to the wheel must be moved to the light spot and still the wheel is unbalanced, then the next heaviest set of weights provided is selected and is placed in pairs on the wheel at locations 120 degrees apart from each other and 60 degrees from the light spot. The symmetrical adjustment process is then repeated, in whichever direction is indicated by the level indicator, until a balanced condition of the wheel is produced. The four weights are then secured to the inboard and outboard rim portions of the wheel in the manner described above. If all the weights of the second set can all be gathered at the light spot without overbalancing the wheel, the third set of four equal weights is selected and the above-described procedure is repeated.

As noted above, it is preferred that the intermediate weight set of rim weights be used to commence the balancing process. When weights of intermediate mass are placed upon the wheel at positions 120 degrees apart from each other and 60 degrees from opposite sides of the light spot, that corrective condition which is exactly at the midpoint of the range of corrective conditions encompassed by the method, and by the weights provided, is imposed upon the wheel. It is recognized that this corrective condition may be insufficient or overly sufficient to statically balance the wheel. If the wheel is overly balanced when the intermediate weights are first positioned upon the wheel, the person balancing the wheel is informed that he need only work downwardly through the range of corrective arrangements afforded by the intermediate weights and possibly only through less than half the range of corrective conditions provided by the lightest set of weights. Conversely, if the wheel is underbalanced when the intermediate weights are first positioned upon the wheel, this person is informed that he need only move the weights toward the light spot and, if the wheel is still not balanced, that he need only adjust the heaviest set of weights through half the range of corrective positions associated with them. Thus, by starting the practice of the method taught by this invention with the intermediate one of the three sets of weights provided, the wheel is balanced in a most efficient manner.

The weights of the second set of weights are sized so that when they are located in pairs on the wheel just toward the light spot from the neutral axis, they exert the same balancing effect upon the wheel as do all four weights of the first set when collected at the light spot and arranged as they would be secured to the wheel. The weights of the third set are sized in a similar manner relative to the weights of the second set. Thus, there are no overlapping effective weight arrangements nor are there any gaps in the range of corrective weight arrangements within the range encompassed by the several sets of weights. Therefore, the invention assures that the smallest possible total amount of weight will be added to a wheel to achieve static balance, and the resultant static balance condition will last for the longest time possible as the tire tread is subsequently worn down in use. The weights of the three sets provided may have values of 0.55 oz., 1.5 oz. and 2.25 oz., for example.

If all four weights of the third and heaviest set of weights can be collected at light spot 22 without balancing or overbalancing the wheel (a rare condition), it is known then that the wheel cannot properly be balanced merely by adding balance weights to the wheel; to balance such a severely unbalanced wheel, it is best to rotate the tire about 180 degrees on the wheel and to recommence the above-described procedure.

To assure the best possible and most long-lasting balance, the minimum amount of weight should be added to the wheel. The procedure described assures, consistent with the competing consideration that a minimum stock of weights should be inventoried for economic reasons, that the least possible weight is applied to an unbalanced wheel to achieve balance, a consideration which is also economically significant. Also, the procedure described assures that the wheel will be balanced if it can in fact be balanced safely, that is, the procedure encompasses any weight arrangement effective to balance the wheel, whereas procedures which rely upon a single weight to perfect balance do not. Because the weights used to accomplish balance are equally distributed on opposite sides of the wheel, the dynamic balance of the wheel is essentially undisturbed, and, in the vast majority of cases, a contribution is made to the elimination of the effects of dynamic unbalance in the wheel.

What is claimed is:

1. A method for balancing an automobile wheel having a tire mounted thereto comprising the steps of positioning the wheel horizontally on a wheel balancing machine, measuring with a high degree of accuracy any deviation of the plane of the wheel from the horizontal thereby to locate the point on the wheel adjacent the rim thereof of maximum balancing effectiveness of balancing weights applied to the wheel, providing, first, second and third sets of balancing rim weights each consisting of four weights of equal value, the weights increasing in value in selected increments from set to set, the weights of the second set being sized so that when they are disposed in pairs on the wheel just toward the point of maximum effectiveness from diametric opposition to each other equidistantly from and on opposite sides of said point they exert upon the wheel the same balancing effect as do all four weights of the first set when collected at said point and arranged substantially as they would be secured to the wheel, the weights of the third set being sized relative to the weights of the second set as the weights of the second set are sized relative to the weights of the first set, placing the second set of weights adjacent the rim of the wheel and arranging the weights in two pairs of weights disposed substantially 120 degrees from each other around the rim and substantially 60 degrees away from opposite sides of said point of maximum effectiveness, adjusting said pairs of weights symmetrically along the wheel rim toward the point of maximum effectiveness from their initial positions to balance the wheel when the weights in their initial positions are ineffective to balance the wheel and adjusting said pairs of weights symmetrically along the wheel rim away from the point of maximum effectiveness from their initial positions to balance the wheel when the weights in their initial positions are effective to overbalance the wheel, connecting one weight of each pair to the one rim adjacent the position of said one weight at the time balance is produced, securing the other weight of each pair to the wheel rim on the opposite side of the wheel at a position approximately corresponding to the circumferential position of the one weight of the pair, replacing the second set of weights with the third set of weights if the second set of weights is insufficient to produce balance when collected at the point of maximum effectiveness, and repeating the placing and arranging, connecting, and securing steps with the weights of the third set to produce balance, and replacing the second set of weights with the first set of weights if the second set is ineffective to produce balance when disposed in pairs diametrically opposite each other equidistant from the point of maximum effectiveness, and repeating the placing and arranging, connecting, and securing steps to produce balance.

References Cited

UNITED STATES PATENTS

| | | | |
|---|---|---|---|
| 2,592,804 | 4/1952 | Holl | 73—485 |
| 2,613,533 | 10/1952 | Jones | 73—487 |
| 2,697,345 | 12/1954 | Currier | 73—487 |
| 3,002,388 | 10/1961 | Bageman | 73—483 |
| 3,272,015 | 9/1966 | Behm | 73—487 XR |

JAMES J. GILL, Primary Examiner